US008216061B2

(12) United States Patent
Pacey

(10) Patent No.: US 8,216,061 B2
(45) Date of Patent: Jul. 10, 2012

(54) WAGERING GAMES WITH UNLOCKABLE BONUS ROUNDS

(75) Inventor: Larry J. Pacey, Northbrook, IL (US)

(73) Assignee: WMS Gaming Inc., Waukegan, IL (US)

( * ) Notice: Subject to any disclaimer, the term of this patent is extended or adjusted under 35 U.S.C. 154(b) by 1317 days.

(21) Appl. No.: 11/887,626

(22) PCT Filed: Mar. 17, 2006

(86) PCT No.: PCT/US2006/009799

§ 371 (c)(1), (2), (4) Date: Oct. 1, 2007

(87) PCT Pub. No.: WO2006/104731

PCT Pub. Date: Oct. 5, 2006

(65) Prior Publication Data

US 2009/0170593 A1 Jul. 2, 2009

Related U.S. Application Data

(60) Provisional application No. 60/667,145, filed on Mar. 31, 2005.

(51) Int. Cl.
*A63F 13/00* (2006.01)

(52) U.S. Cl. ........................................... 463/25; 463/24

(58) Field of Classification Search ................ 43/20, 42; 463/24, 25

See application file for complete search history.

(56) References Cited

U.S. PATENT DOCUMENTS

| | | | | |
|---|---|---|---|---|
| 3,911,318 | A | 10/1975 | Spero et al. | |
| 4,342,454 | A | 8/1982 | Baer et al. | 273/85 |
| 4,575,622 | A | 3/1986 | Pellegrini | 235/382 |
| 4,752,068 | A | 6/1988 | Endo | 273/1 E |
| 4,764,666 | A | 8/1988 | Bergeron | 235/380 |
| 4,858,930 | A | 8/1989 | Sato | 273/85 |
| 4,882,473 | A | 11/1989 | Bergeron et al. | 235/380 |
| 4,948,138 | A | 8/1990 | Pease et al. | 273/138 |

(Continued)

FOREIGN PATENT DOCUMENTS

DE 4200254 8/1993

(Continued)

OTHER PUBLICATIONS

U.S. Appl. No. 60/200,329, filed Apr. 28, 2000, 8 pages.

(Continued)

*Primary Examiner* — Peter DungBa Vo

*Assistant Examiner* — Jeffrey Wong

(74) *Attorney, Agent, or Firm* — Nixon Peabody LLP

(57) ABSTRACT

Method and system are disclosed for allowing players at wagering game terminals to select entire sets of bonus games instead of a single bonus game upon occurrence of a certain randomly selected basic game outcome. One or more of the bonus games or sets of bonus games may be temporarily unavailable or "locked" to the player. The player may unlock the bonus games or sets of bonus games by acquiring certain game assets, reaching certain game milestones, and/or exceeding certain wagering levels. The unlocked games may reveal credits, prizes, progressives, basic and/or bonus game updates, or additional bonus games, some of which may also be locked. The updates and additions may already be present in the wagering game terminals or they may be downloaded from a central location. The player may retain the locked and unlocked statuses of the bonus games across multiple wagering game sessions and/or wagering game terminals.

22 Claims, 10 Drawing Sheets

U.S. PATENT DOCUMENTS

| | | | | |
|---|---|---|---|---|
| 5,014,982 | A | 5/1991 | Okada et al. | 273/435 |
| 5,018,736 | A | 5/1991 | Pearson et al. | 273/439 |
| 5,179,517 | A | 1/1993 | Sarbin et al. | 364/410 |
| 5,265,874 | A | 11/1993 | Dickinson et al. | 273/138 |
| 5,292,127 | A | 3/1994 | Kelly et al. | 273/138 R |
| 5,321,241 | A | 6/1994 | Craine | 235/380 |
| 5,370,306 | A | 12/1994 | Schulze et al. | 273/138 |
| 5,370,399 | A | 12/1994 | Liverance | 273/434 |
| 5,393,057 | A | 2/1995 | Marnell, II | 273/85 |
| 5,429,361 | A | 7/1995 | Raven et al. | 273/138 |
| 5,451,259 | A | 9/1995 | Krogh | |
| 5,470,079 | A | 11/1995 | LeStrange et al. | 273/138 |
| 5,533,727 | A | 7/1996 | DeMar | 463/23 |
| 5,547,202 | A | 8/1996 | Tsumura | 463/29 |
| 5,551,692 | A | 9/1996 | Pettit et al. | 273/143 R |
| 5,575,474 | A | 11/1996 | Rossides | 273/138 |
| 5,580,053 | A | 12/1996 | Crouch | 463/20 |
| 5,580,309 | A | 12/1996 | Piechowiak et al. | 463/16 |
| 5,586,766 | A | 12/1996 | Forte et al. | 273/309 |
| 5,586,936 | A | 12/1996 | Bennett et al. | 463/25 |
| 5,609,525 | A | 3/1997 | Ohmo et al. | 463/43 |
| 5,655,961 | A | 8/1997 | Acres et al. | 463/27 |
| 5,674,128 | A | 10/1997 | Holch et al. | 463/42 |
| 5,702,304 | A | 12/1997 | Acres et al. | 463/29 |
| 5,741,183 | A | 4/1998 | Acres et al. | 463/42 |
| 5,743,523 | A | 4/1998 | Kelly et al. | 273/138.1 |
| 5,743,800 | A | 4/1998 | Huard et al. | 463/26 |
| 5,752,882 | A | 5/1998 | Acres et al. | 463/42 |
| 5,761,647 | A | 6/1998 | Boushy | 705/10 |
| 5,770,533 | A | 6/1998 | Franchi | 463/42 |
| 5,816,918 | A | 10/1998 | Kelly et al. | 463/16 |
| 5,820,459 | A | 10/1998 | Acres et al. | 463/25 |
| 5,833,537 | A | 11/1998 | Barrie | 463/21 |
| 5,833,540 | A | 11/1998 | Miodunski et al. | 463/42 |
| 5,836,817 | A | 11/1998 | Acres et al. | 463/26 |
| 5,882,258 | A | 3/1999 | Kelly et al. | 463/11 |
| 5,902,983 | A | 5/1999 | Crevelt et al. | 235/380 |
| 5,919,091 | A | 7/1999 | Bell et al. | 463/25 |
| 5,931,467 | A | 8/1999 | Kamille | 273/139 |
| 5,931,557 | A | 8/1999 | Danilychev | |
| 5,957,775 | A | 9/1999 | Cherry | 463/16 |
| 5,983,196 | A | 11/1999 | Wendkos | 705/14 |
| 5,997,401 | A | 12/1999 | Crawford | 463/20 |
| 6,004,211 | A | 12/1999 | Brenner et al. | 463/40 |
| 6,007,426 | A | 12/1999 | Kelly et al. | 463/16 |
| 6,009,412 | A | 12/1999 | Storey | 705/14 |
| 6,012,983 | A | 1/2000 | Walker et al. | 463/20 |
| 6,015,344 | A | 1/2000 | Kelly et al. | 463/16 |
| 6,048,269 | A | 4/2000 | Burns et al. | 463/25 |
| 6,061,660 | A | 5/2000 | Eggleston et al. | 705/14 |
| 6,068,552 | A | 5/2000 | Walker et al. | 463/21 |
| 6,068,553 | A | 5/2000 | Parker | 463/27 |
| 6,077,163 | A | 6/2000 | Walker et al. | 463/26 |
| 6,110,041 | A | 8/2000 | Walker et al. | 463/20 |
| 6,113,098 | A | 9/2000 | Adams | 273/143 |
| 6,113,493 | A | 9/2000 | Walker et al. | 463/25 |
| 6,162,122 | A | 12/2000 | Acres et al. | 463/29 |
| 6,165,071 | A | 12/2000 | Weiss | 463/24 |
| 6,178,408 | B1 | 1/2001 | Copple et al. | 705/14 |
| 6,179,710 | B1 | 1/2001 | Sawyer et al. | 463/16 |
| 6,193,608 | B1 | 2/2001 | Walker et al. | 463/25 |
| 6,203,430 | B1 | 3/2001 | Walker et al. | 463/20 |
| 6,227,972 | B1 | 5/2001 | Walker et al. | 463/25 |
| 6,231,445 | B1 | 5/2001 | Acres | 463/42 |
| 6,234,896 | B1 | 5/2001 | Walker et al. | 463/16 |
| 6,244,958 | B1 | 6/2001 | Acres | 463/26 |
| 6,251,014 | B1 | 6/2001 | Stockdale et al. | 463/16 |
| 6,254,483 | B1 | 7/2001 | Acres | 463/26 |
| 6,273,820 | B1 | 8/2001 | Haste, III | 463/40 |
| 6,280,325 | B1 | 8/2001 | Fisk | 463/19 |
| 6,280,326 | B1 | 8/2001 | Saunders | 463/25 |
| 6,293,866 | B1 | 9/2001 | Walker et al. | 463/20 |
| 6,302,793 | B1 | 10/2001 | Fertitta, III et al. | 463/25 |
| 6,311,976 | B1 | 11/2001 | Yoseloff et al. | 273/138 |
| 6,312,334 | B1 | 11/2001 | Yoseloff | 705/14 |
| 6,315,666 | B1 | 11/2001 | Mastera et al. | 463/31 |
| 6,319,127 | B1 | 11/2001 | Walker et al. | 463/26 |
| 6,334,613 | B1 | 1/2002 | Yoseloff | 463/21 |
| 6,340,331 | B1 | 1/2002 | Saunders et al. | 463/20 |
| 6,364,765 | B1 | 4/2002 | Walker et al. | 273/143 |
| 6,364,766 | B1 | 4/2002 | Anderson et al. | 463/16 |
| 6,371,852 | B1 | 4/2002 | Acres | 463/25 |
| 6,394,900 | B1 | 5/2002 | McGlone et al. | 463/29 |
| 6,394,907 | B1 | 5/2002 | Rowe | 463/24 |
| 6,398,650 | B1 | 6/2002 | Horigami et al. | 705/14 |
| 6,431,983 | B2 | 8/2002 | Acres | 463/25 |
| 6,511,375 | B1 * | 1/2003 | Kaminkow | 463/20 |
| 6,533,273 | B2 | 3/2003 | Cole et al. | 273/138 |
| 6,540,609 | B1 | 4/2003 | Paige | 463/25 |
| 6,559,460 | B1 | 5/2003 | Keogh et al. | |
| 6,592,456 | B2 | 7/2003 | Walker et al. | 463/20 |
| 6,592,457 | B1 | 7/2003 | Frohm et al. | 463/25 |
| 6,599,185 | B1 * | 7/2003 | Kaminkow et al. | 463/16 |
| 6,605,001 | B1 | 8/2003 | Tarantino | 705/14 |
| 6,609,975 | B1 | 8/2003 | Sawyer et al. | 463/26 |
| 6,612,575 | B1 | 9/2003 | Cole et al. | 273/138 |
| 6,634,943 | B1 * | 10/2003 | Baerlocher | 463/25 |
| 6,682,421 | B1 | 1/2004 | Rowe et al. | 463/25 |
| 6,746,327 | B2 * | 6/2004 | Frohm et al. | 463/16 |
| 6,752,312 | B1 | 6/2004 | Chamberlain et al. | 235/375 |
| 6,758,757 | B2 | 7/2004 | Lucianno et al. | 463/24 |
| 6,776,713 | B2 | 8/2004 | Gauselmann | 463/16 |
| 6,780,111 | B2 | 8/2004 | Cannon et al. | 463/24 |
| 6,800,027 | B2 * | 10/2004 | Giobbi et al. | 463/24 |
| 6,811,486 | B1 * | 11/2004 | Luciano, Jr. | 463/24 |
| 6,840,860 | B1 | 1/2005 | Okuniewicz | 463/35 |
| 6,923,721 | B2 | 8/2005 | Lucianno et al. | 463/24 |
| 6,991,539 | B2 | 1/2006 | Pacey | 463/16 |
| 7,182,690 | B2 | 2/2007 | Giobbi et al. | 463/24 |
| 7,811,167 | B2 | 10/2010 | Giobbi et al. | 463/24 |
| 2001/0046893 | A1 * | 11/2001 | Giobbi et al. | 463/24 |
| 2001/0048193 | A1 | 12/2001 | Yoseloff et al. | 273/138.1 |
| 2002/0074726 | A1 | 6/2002 | Yoseloff et al. | 273/274 |
| 2002/0077170 | A1 | 6/2002 | Johnson et al. | 463/16 |
| 2002/0077174 | A1 | 6/2002 | Luciano et al. | 463/25 |
| 2002/0093136 | A1 | 7/2002 | Moody | 273/139 |
| 2002/0107065 | A1 | 8/2002 | Rowe | 463/20 |
| 2002/0155873 | A1 * | 10/2002 | Berman et al. | 463/16 |
| 2003/0013515 | A1 | 1/2003 | Row et al. | 463/25 |
| 2003/0013531 | A1 | 1/2003 | Row et al. | 463/42 |
| 2003/0036427 | A1 | 2/2003 | Brandstetter et al. | 463/29 |
| 2003/0078101 | A1 | 4/2003 | Schneider et al. | 463/42 |
| 2003/0100362 | A1 | 5/2003 | Horniak et al. | 463/25 |
| 2003/0114219 | A1 | 6/2003 | McClintic | 463/25 |
| 2003/0157979 | A1 | 8/2003 | Cannon et al. | 463/16 |
| 2003/0176220 | A1 * | 9/2003 | Baerlocher | 463/26 |
| 2004/0048649 | A1 * | 3/2004 | Peterson et al. | 463/20 |
| 2004/0142742 | A1 | 7/2004 | Schneider et al. | 463/25 |
| 2004/0147306 | A1 * | 7/2004 | Randall et al. | 463/20 |
| 2004/0171416 | A1 * | 9/2004 | Baerlocher et al. | 463/16 |
| 2004/0209662 | A1 | 10/2004 | Wadleigh | 463/16 |
| 2004/0219967 | A1 * | 11/2004 | Giobbi et al. | 463/16 |
| 2005/0159207 | A1 | 7/2005 | Thomas | 463/20 |
| 2006/0068893 | A1 | 3/2006 | Jaffe et al. | 463/20 |
| 2006/0079316 | A1 | 4/2006 | Flemming et al. | 463/25 |
| 2006/0079317 | A1 | 4/2006 | Flemming et al. | 463/25 |
| 2006/0084495 | A1 | 4/2006 | Jaffe et al. | 463/20 |
| 2006/0084496 | A1 | 4/2006 | Jaffe et al. | 463/20 |
| 2006/0089194 | A1 | 4/2006 | Joshi et al. | 463/25 |
| 2007/0254734 | A1 | 11/2007 | Gilmore et al. | 463/20 |
| 2007/0259706 | A1 | 11/2007 | Anderson et al. | 463/16 |
| 2007/0259713 | A1 | 11/2007 | Fiden et al. | 463/25 |
| 2007/0265060 | A1 | 11/2007 | Hornik et al. | 463/20 |
| 2007/0298856 | A1 | 12/2007 | Gilmore et al. | 463/16 |
| 2008/0113770 | A1 | 5/2008 | Gelber et al. | 463/25 |
| 2009/0011822 | A1 | 1/2009 | Engleman et al. | 463/24 |
| 2009/0011823 | A1 | 1/2009 | Engelman et al. | 463/25 |
| 2009/0054136 | A1 | 2/2009 | Gagner et al. | 463/25 |
| 2009/0124372 | A1 | 5/2009 | Gagner et al. | 463/29 |
| 2009/0247301 | A1 | 10/2009 | Hamlin et al. | 463/42 |
| 2010/0048292 | A1 | 2/2010 | Anderson et al. | 463/25 |
| 2010/0240442 | A1 | 9/2010 | Anderson et al. | 463/43 |

FOREIGN PATENT DOCUMENTS

| | | |
|---|---|---|
| DE | 4202734 | 8/1993 |
| DE | 4236968 | 5/1994 |
| EP | 0 360 613 | 3/1990 |

| | | | |
|---|---|---|---|
| EP | 0 431 723 | | 6/1991 |
| EP | 1363253 | A2 | 11/2003 |
| ES | 2028694 | | 7/1992 |
| GB | 2 241 098 | | 8/1991 |
| GB | 2 332 151 | | 6/1999 |
| JP | 60-106680 | | 7/1985 |
| JP | 61-208743 | | 9/1986 |
| JP | 2265584 | | 10/1990 |
| JP | 04-009177 | | 1/1992 |
| JP | 04-079977 | | 3/1992 |
| JP | 05-277233 | | 10/1993 |
| JP | 07-024128 | | 1/1995 |
| JP | 07-155453 | | 6/1995 |
| JP | 7-263160 | | 10/1995 |
| JP | 09-276500 | | 10/1997 |
| JP | 10-066777 | | 3/1998 |
| JP | 10-146423 | | 6/1998 |
| JP | 11-309246 | | 11/1999 |
| JP | 2001-155882 | | 6/2001 |
| WO | WO 95/22811 | | 8/1995 |
| WO | WO 97/12338 | | 4/1997 |
| WO | WO 9929381 | A1 | 6/1999 |
| WO | WO 01/99067 | A2 | 12/2001 |
| WO | WO 02/21467 | | 3/2002 |
| WO | WO 2005082480 | A1 | 9/2005 |
| WO | WO-2005-117069 | | 12/2005 |
| WO | WO 2006/004832 | A2 | 1/2006 |
| WO | WO 2006/005073 | A2 | 1/2006 |
| WO | WO 2006002241 | A2 | 1/2006 |
| WO | WO 2006004831 | A2 | 1/2006 |
| WO | WO 2006004832 | A2 | 1/2006 |
| WO | WO 2006005073 | A2 | 1/2006 |
| WO | WO 2006/017067 | A1 | 2/2006 |
| WO | WO 2006017036 | A1 | 2/2006 |
| WO | WO 2006017067 | A1 | 2/2006 |
| WO | WO 2006017068 | A1 | 2/2006 |
| WO | WO 2006020811 | A2 | 2/2006 |
| WO | WO 2006026250 | A2 | 3/2006 |
| WO | WO 2006044252 | A2 | 4/2006 |
| WO | WO 2007/103054 | A2 | 9/2007 |
| WO | WO 2008/048634 | A2 | 4/2008 |

OTHER PUBLICATIONS

Written Opinion corresponding to co-pending International Patent Application Serial No. PCT/US2006/09799, United States Patent Office, dated Mar. 14, 2007; (5 pages).

International Search Report corresponding to co-pending International Patent Application Serial No. PCT/US2006/09799, United States Patent Office, dated Mar. 14, 2007; (2 pages).

* cited by examiner

WAGERING GAMES WITH UNLOCKABLE BONUS ROUNDS

CROSS-REFERENCE TO RELATED APPLICATIONS

This application is a U.S. national phase of International Application No. PCT/US2006/009799, filed Mar. 17, 2006, which claims the benefit of priority of U.S. Provisional Patent Application No. 60/667,145 filed Mar. 31, 2005, both of which are incorporated by reference in their entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to wagering game terminals and, more particularly, to a method and system of conducting a wagering game on such terminals where players may select a group of bonus games to play from several groups of bonus games, and where the bonus games may be updated from time to time from a central location.

BACKGROUND OF THE INVENTION

Wagering game terminals, such as slot machines, video poker machines, and the like, have been a cornerstone of the gaming industry for several years. Generally, the popularity of such terminals among players depends on the perceived likelihood of winning money at the terminal and the intrinsic entertainment value of the terminal relative to other available gaming options. Where the available gaming options include a number of competing terminals and the expectation of winning each terminal is roughly the same (or believed to be the same), players are most likely to be attracted to the more entertaining and exciting terminal. Consequently, wagering game terminal operators strive to employ the most entertaining and exciting terminals available because such terminals attract frequent play and, hence, increase profitability for the operators.

One concept that is often employed in the gaming industry is the use of progressive games. A "progressive" game involves collecting coin-in data from participating wagering game terminals (e.g., slot machines), contributing a percentage of that coin-in data to a progressive jackpot amount, and awarding that jackpot amount to a player upon the occurrence of a certain jackpot-won event. A jackpot-won event typically occurs when a "progressive winning position" is achieved at a participating wagering game terminal. If the wagering game terminal is a slot machine, a progressive winning position may, for example, correspond to alignment of progressive jackpot reel symbols along a certain payline. The initial progressive jackpot is a predetermined minimum amount. That jackpot amount, however, progressively increases as players continue to play the wagering game terminals without winning the jackpot. Further, when several wagering game terminals are linked together such that several players compete for the same jackpot, the jackpot progressively increases at a much faster rate, which leads to further player excitement.

Another concept that has been successfully employed is a secondary or "bonus" game played in conjunction with a "basic" game. The bonus game may include any type of game, either similar to or entirely different from the basic game, and is initiated by the occurrence of certain pre-selected events or outcomes in the basic game. The addition of such a bonus game has been found to produce a significantly higher level of player excitement than the basic game alone because it provides an additional chance to play, which increases the player's overall expectation of winning.

In existing wagering game terminals, the bonus games are usually limited to a particular bonus game, or if multiple bonus games are available, the wagering game terminal usually selects the bonus game for the player. Further, the bonus games tend to be static or fixed such that the players can eventually complete every aspects of the games after a while. Thus, in the highly competitive wagering game terminal industry, there is a continuing need to develop new types of games, or improvements to existing games, that will enhance the entertainment value and excitement associated with the games in order to increase play. Allowing the players to select the bonus game and/or a group of bonus games and/or various aspects of the bonus games would provide more player excitement and enjoyment and, therefore, would increase play. Play would be further increased if the bonus game and/or a group of bonus games and/or various aspects of the bonus games were provided in the form of new games, or updates to existing games, that are downloaded from a central location, either as needed or according to a predetermined schedule.

SUMMARY OF THE INVENTION

The present invention is directed to a method and system for operating wagering game terminals that provide increased excitement and enjoyment over existing wagering game terminals. The method and system of the invention allow players to select entire sets or groups of bonus games instead of a single bonus game upon occurrence of a certain randomly selected basic game outcome. One or more of the bonus games or sets of bonus games may be temporarily unavailable or "locked" to the player. The player may unlock the games or sets of games by acquiring certain game assets, reaching certain game milestones, and/or exceeding certain wagering levels. The unlocked bonus games may reveal credits, prizes, progressives, basic and/or bonus game updates, winning symbol combinations, or additional bonus games, some of which may also be locked. The updates and additions may already be present in the wagering game terminals, or they may be downloaded from a central location. The download may occur on an as-needed basis, or it may occur according to a predetermined schedule. The player may retain the statuses of the bonus games, including the locked and unlocked statuses, across multiple wagering game sessions and/or wagering game terminals.

In general, in one aspect, the invention is directed to a wagering game terminal. The wagering game terminal comprises a wager input for accepting a wager from a player at the wagering game terminal, and a display unit for displaying a wagering game of the wagering game terminal, the wagering game having an outcome that is randomly selected from a plurality of outcomes, including a special-event outcome. In response to the randomly selected outcome being the special-event outcome, the display unit displays a selection screen containing a plurality of special-event options from which the player may select. Each special-event option reveals a plurality of special events when selected by the player, including at least one special event that is available to the player only upon satisfaction of a predetermined condition.

In general, in another aspect, the invention is directed to a method of increasing game diversity in a wagering game terminal. The method comprises the step of accepting a wager input at the wagering game terminal, the wager input initiating a wagering game in which an outcome is randomly selected from a plurality of outcomes, including a special-event outcome. The method further comprises the step of displaying a selection screen on the wagering game terminal upon occurrence of the special-event outcome as the randomly selected outcome, the selection screen containing a plurality of special-event options. A player may then select one of the options to reveal one or more special events, including at least one unlockable special event.

In general, in yet another aspect, the invention is directed to a wagering game system. The system comprises a plurality of wagering game terminals connected to a network, each wagering game terminal conducting a wagering game in which an outcome is randomly selected from a plurality of outcomes, including a special-event outcome. The system further comprises a network controller connected to the network and configured to store wagering game updates for the wagering game terminals and to download the wagering game updates to the wagering game terminals using a file transfer protocol. The wagering game terminals are configured to display a selection screen upon occurrence of the special-event outcome, the selection screen containing a plurality of special-event options. Each option reveals one or more special events when selected by a player, wherein at least one of the special events is updated with the wagering game updates.

In general, in still another aspect, the invention is directed to a method of updating a wagering game in a wagering game terminal. The method comprises the steps of storing the wagering game updates in a central location to which the wagering game terminal is connected and transferring the wagering game updates from the central location to the wagering game terminal upon occurrence of a predetermined event. The wagering game terminal is connected to the central location via a network and the wagering game updates are transferred over the network using a file transfer protocol.

In general, in yet another aspect, the invention is directed to a network controller having a plurality of wagering game terminals connected thereto. The network controller comprises a computer readable storage medium and a game-assets database stored on the computer readable storage medium. The game-assets database contains bonus game updates for the wagering game terminals, including one or more of a new episode for a bonus game, a new feature for a bonus game, and a new bonus level for a bonus game. At least one file transfer protocol is stored on the computer readable storage medium. The network controller is configured to download the bonus game updates to the wagering game terminals using a selected one of the at least one file transfer protocol.

The above summary of the present invention is not intended to represent each embodiment, or every aspect, of the present invention. The detailed description and figures will describe many of the embodiments and aspects of the present invention.

BRIEF DESCRIPTION OF THE DRAWINGS

The foregoing and other advantages of the invention will become apparent upon reading the following detailed description and upon reference to the drawings, wherein.

Figure 1:
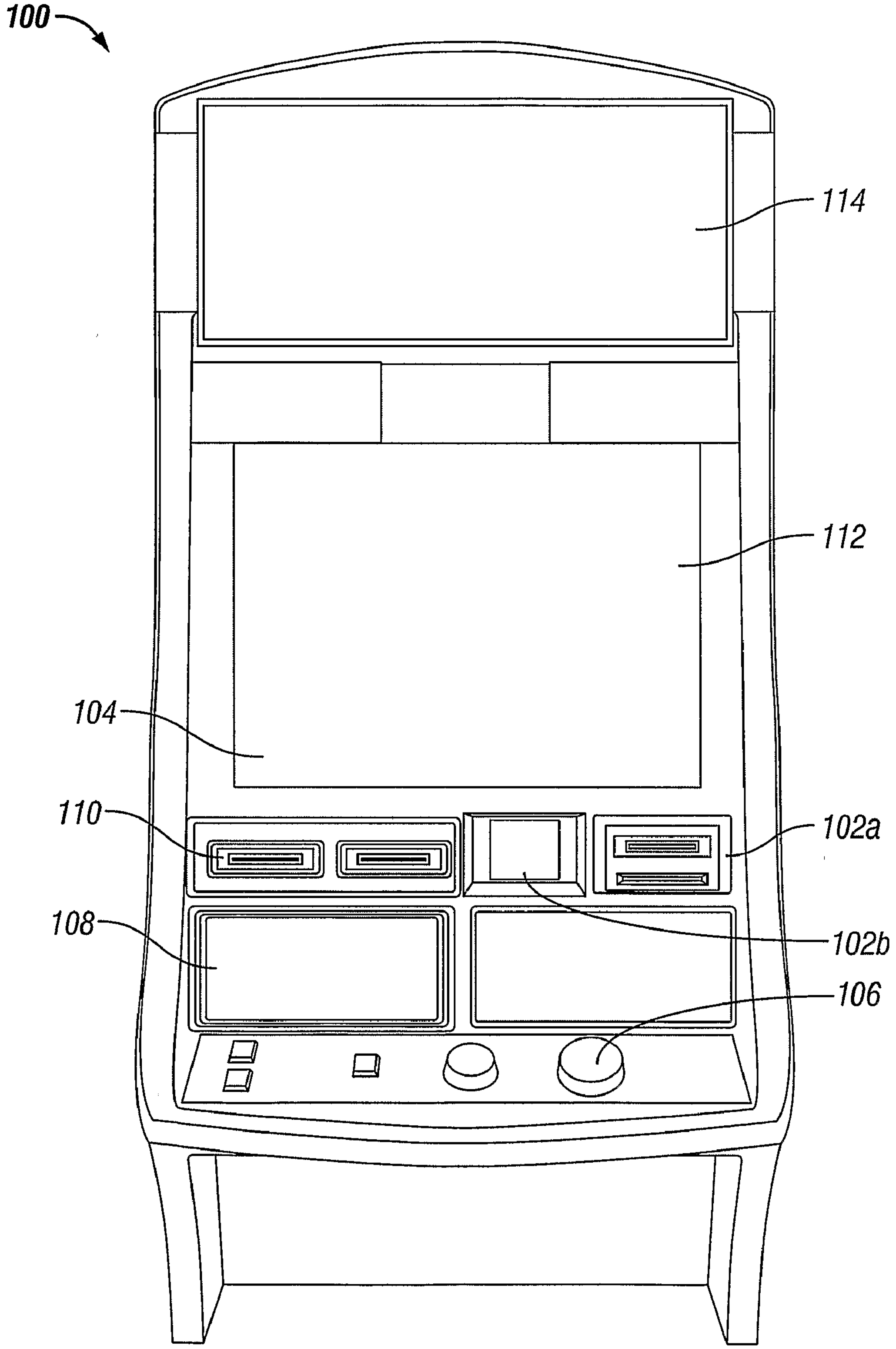
FIG. 1 illustrates a perspective view of a wagering game terminal according to one embodiment of the invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DESCRIPTION OF ILLUSTRATIVE EMBODIMENTS

As alluded to above, embodiments of the invention provide a method and system where a player may experience a wide range of bonus games from the same basic game. The bonus games are provided in sets or groups from which the player may select, with some bonus games and/or some sets or groups of bonus games temporarily unavailable or "locked" to the player. The player may unlock the locked bonus games to reveal credit awards, prizes, progressives, updates to existing basic and/or bonus games, winning symbol combinations, and additional bonus games, some of which may also be locked.

The updates and additions may be already present on the wagering game terminal, or they may be downloaded to the wagering game terminal from a central location via a download service. The downloads may occur in real time as needed when the player satisfies one or more predetermined conditions in a basic and/or bonus game, or they may occur at a predetermined time, or according to a predefined schedule entirely independent of the player. The locked and unlocked statuses of the bonus games may be retained by the player across multiple wagering game sessions and/or wagering game terminals.

The above arrangement allows a player to benefit from his or her previous experiences while enjoying many variations and levels of the same bonus games as well as new and different bonus games from one basic wagering game. Moreover, new basic and/or bonus games, including modifications and/or additions to these games, may continue to be deployed as they are designed and uploaded to the central location, thus ensuring that the player does not exhaust all aspects of the basic and/or bonus games within too short a period of time.

FIG. 1 shows a perspective view of an exemplary wagering game terminal 100 according to embodiments of the invention. The wagering game terminal 100 may be operated as a stand-alone terminal, or it may be connected to a network of wagering game terminals. Further, the wagering game terminal 100 may be any type of wagering game terminal and may have varying structures and methods of operation. For example, the wagering game terminal 100 may be a mechanical wagering game terminal configured to play mechanical slots, or it may be an electromechanical or electrical wagering game terminal configured to play a video casino game, such as blackjack, slots, keno, poker, etc. In the example shown, the wagering game terminal 100 is a video slot machine.

As shown, the wagering game terminal 100 includes input devices, such as a wager acceptor 102 (shown as a card wager acceptor 102*a* and a cash wager acceptor 102*b*), a touch screen 104, a push-button panel 106, a payout mechanism 108, and a information reader 110. The wagering game terminal 100 further includes a main display 112 for displaying information about the basic wagering game and, in some embodiments, a secondary display 114 for displaying a pay table and/or game-related information or other entertainment features. While these typical components found in the wagering game terminal 100 are described briefly below, it should be understood that numerous other elements may exist and may be used in any number of combinations to create variations of the wagering game terminal 100.

The wager acceptors 102*a* and 102*b* may be provided in many forms, individually or in combination. For example, the cash wager acceptor 102*a* may include a coin slot acceptor or a note acceptor to input value to the wagering game terminal 100. The card wager acceptor 102*b* may include a card-reading device for reading a card that has a recorded monetary value with which it is associated. The card wager acceptor 102*b* may also receive a card that authorizes access to a central account that can transfer money to the wagering game terminal 100.

The payout mechanism 108 performs the reverse function of the wager acceptors 102*a* and 102*b*. For example, the payout mechanism 108 may include a coin dispenser or a note dispenser to dispense money or tokens from the wagering game terminal 100. The payout mechanism 108 may also be adapted to receive a card that authorizes the wagering game terminal 100 to transfer credits from the wagering game terminal 100 to a central account.

The push button panel 106 is typically offered, in addition to the touch screen 104, to provide players with an option on making their game selections. Alternatively, the push button panel 106 may facilitate player input needed for certain aspects of operating the game, while the touch screen 104 facilitates player input needed for other aspects of operating the game.

The outcome of the basic wagering game is displayed to the player on the main display 112. The main display 112 may take a variety of forms, including a cathode ray tube (CRT), a high resolution LCD, a plasma display, LED, or any other type of video display suitable for use in the wagering game terminal 100. As shown here, the main display 112 also includes the touch screen 104 overlaying the entire display (or a portion thereof) to allow players to make game-related selections. Alternatively, the wagering game terminal 100 may include a number of mechanical reels that display the game outcome.

In some embodiments, the information reader 110 is a card reader that allows for identification of a player by reading a card with information indicating the player's identity. Currently, identification is used by casinos for rewarding certain players with complimentary services or special offers. For example, a player may be enrolled in the gaming establishment's players' club and may be awarded certain complimentary services as that player collects points in his or her player-tracking account. The player inserts his or her card into the information reader 110, which allows the casino's computers to register that player's wagering at the wagering game terminal 100. Then, the wagering game terminal 100 may use the secondary display 114 for providing the player with information about his or her account or other player-specific information. Also, in some embodiments, the information reader 110 may be used to restore game status information for a previous gaming session that the player had played.

Figure 2:
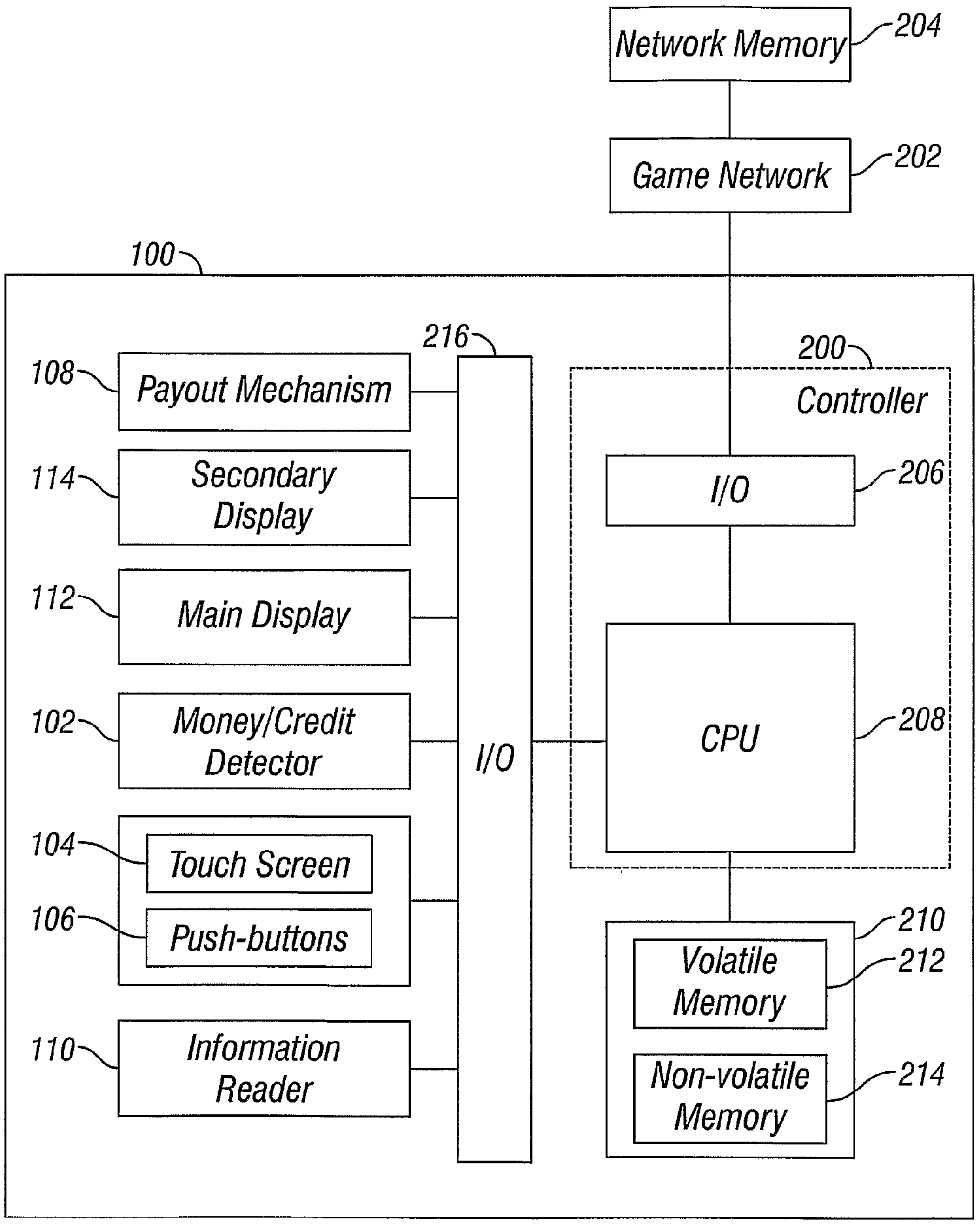
FIG. 2 illustrates the wagering game terminal of FIG. 1 in more detail.

As shown in FIG. 2, the wagering game terminal 100 and associated wagering game control system is capable of executing wagering games on or through a controller 200. The controller 200, as used herein, comprises any combination of hardware, software, and/or firmware that may be disposed or resident inside and/or outside of the wagering game terminal 100 or like machine which may communicate with and/or control the transfer of data between the wagering game terminal 100 and a data bus, another computer, processor, or device, and/or a service and/or a network. Such a network is shown at 202 and may include, but is not limited to, a peer-to-peer, client/server, master/slave, star network, ring network, bus network, or other network architecture wherein at least one processing device (e.g., computer) is linked to at least one other processing device. A network memory 204 is connected to the network 202 for storing data and/or information transferred over the network 202, including game status information.

The controller 200 may comprise input/output (I/O) circuits 206 and a CPU 208. The CPU 208 may also be housed outside of the controller 200, and a different processor may be housed within the controller 200. The controller 200, as used herein, may also comprise multiple CPUs 208. In one implementation, each wagering game terminal 100 comprises, or is connected to, a controller 200 enabling each wagering game terminal 100 to transmit and/or receive signals, preferably both, in a peer-to-peer arrangement. In another example, the controller 200 may be adapted to facilitate communication and/or data transfer for one or more wagering game terminals 100 in a client/server or centralized arrangement. In one aspect, as shown in FIG. 2, the controller 200 may connect the wagering game terminal 100 via a conventional I/O port and communication path (e.g., serial, parallel, IR, RC, 10bT, etc.) to the game network 202, which may include, for example, other wagering game terminals connected together in the network 202. To provide the wagering game functions, the controller 200 executes a game program that generates a randomly selected game outcome.

The controller 200 is also coupled to or includes a local memory 210. The local memory 210 may be in the form of one or more volatile memories 212 (e.g., a random-access memory (RAM)) and one or more non-volatile memories 214 (e.g., an EEPROM). Communication between the peripheral components of the wagering game terminal 100 and the controller 200 is controlled by the controller 200 through the I/O circuits 216.

Figure 3:
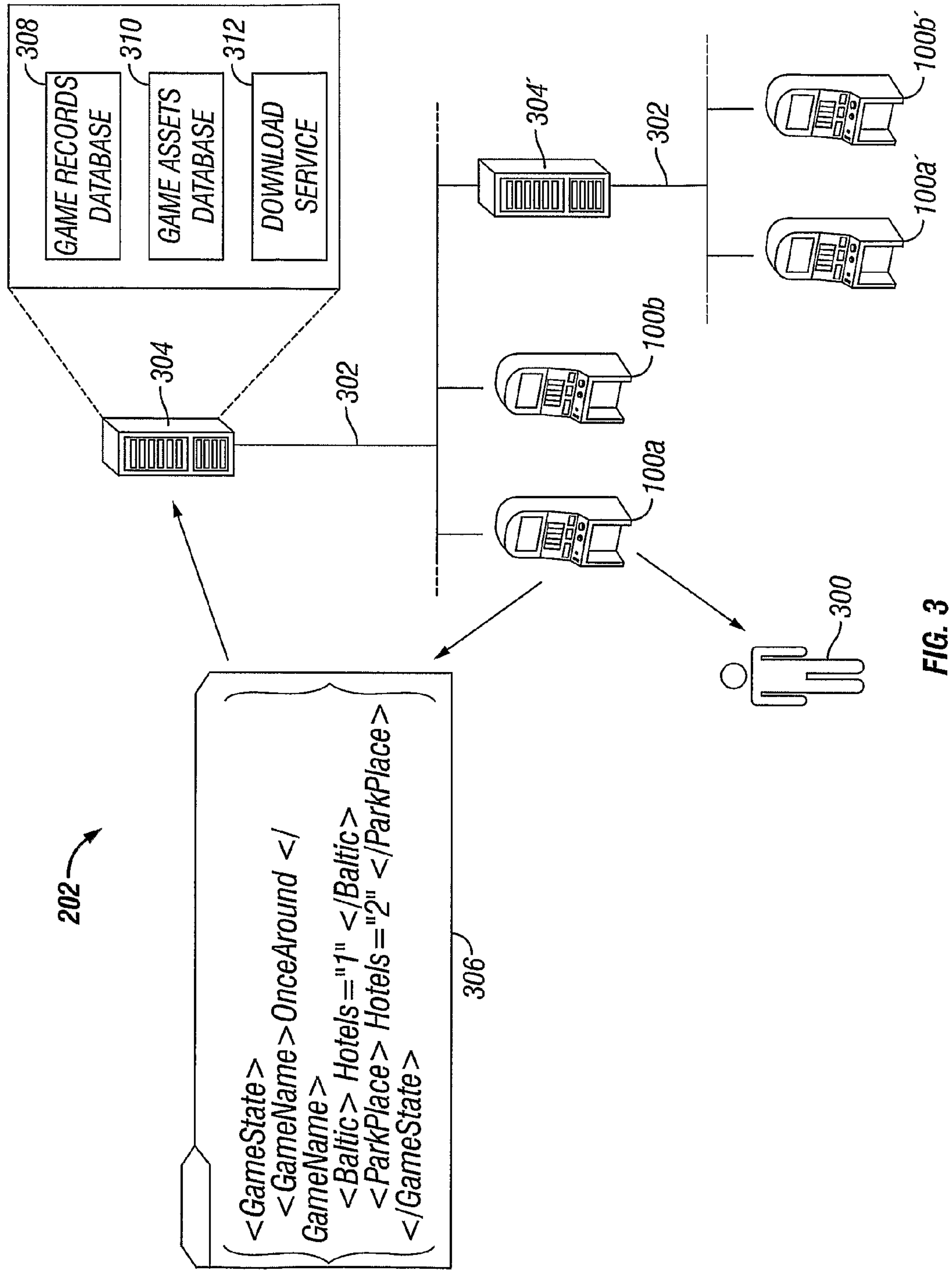
FIG. 3 illustrates a network to which the wagering game terminal of FIG. 1 may be connected for saving game records and receiving game updates according to one embodiment of the invention.

As mentioned above, the wagering game terminal 100 may be a stand-alone terminal, or it may be part of the network 202 that connects multiple wagering game terminals 100 together. FIG. 3 illustrates the network 202 in more detail, including a plurality of wagering game terminals 100*a* and 100*b* connected via a network (e.g., Ethernet, TCP/IP) connection 302 to a network controller 304. The wagering game terminals 100*a* and 100*b* are similar to the wagering game terminal 100 (FIG. 1) in that they have many of the same features and components. In addition, one or more functions of the terminals 100*a* and 100*b* may reside on the network controller 304 instead of, or in addition to, the wagering game terminal 100*a* and 100*b*. The network controller 304 may then conduct the basic and/or bonus games (or portions thereof) for each of the wagering game terminals 100*a* and 100*b* connected to the network 202, including providing the input data and information needed to operate the basic and/or bonus games.

The network controller 304 may also control the progressive jackpots mentioned previously that are contributed to by all or some of the wagering game terminals 100*a* and 100*b* in the network 202 (e.g., terminal-level jackpots that each terminal 100*a* or 100*b* contributes to individually, bank-level jackpots that are contributed to by all of the terminals 100*a* and 100*b* in a particular bank, and wide-area jackpots that are contributed to by a larger number of terminals 100*a* and 100*b*, such as multiple banks).

In addition, in accordance with embodiments of the invention, the network 202 allows players playing at one of the wagering game terminals 100*a* or 100*b* to store game status information for their basic and/or bonus games when they wish to stop playing. The players may then restore the game statuses of their basic and/or bonus game at a later time when they wish to start playing again. The game statuses may include any and all aspects of a basic and/or bonus game, whether tangible or intangible, that a player may win, accumulate, acquire, and obtain. For example, the game statuses may include monetary or non-monetary awards, features or characteristics of a game (e.g., a wild symbol, free spins, etc.), features or characteristics of a player (e.g., extra lives, strength, skills, intelligence, equipment, etc.), games played, levels attained, milestones reached, rankings, bonus games acquired, game choices made, and the like. By allowing the players to retain their game statuses when they stop playing, the players have much incentive to return to the wagering game terminals 100*a* or 100*b* at a later time.

In some embodiments, the game status information may be retained through a "ticket-in-ticket-out" (TITO) system on the network 202. The TITO system issues the player a ticket for the current wagering game session when the player departs a wagering game terminal 100*a* or 100*b*. The ticket can be presented later at any wagering game terminal 100*a* or 100*b* on the network 202 to identify the particular wagering game session that was stored. The player may then retrieve his or her game status information and continue playing at the point where he or she left off. An exemplary implementation of a TITO system is described below.

Referring still to FIG. 3, when a player 300 is ready to cash out of any wagering game terminal 100*a* or 100*b* on the network 202, the player 300 may request a ticket for his or her current wagering game session. Upon receiving such a request, the wagering game terminal 100*a* or 100*b* terminates the game and generates a game-specific file 306 in which it stores various information about the game. In one implementation, the game-specific file 306 may identify the wagering game terminal used, game played, game statuses accumulated, game selections, and other similar information. The game-specific file 306, which may be a text file, XML file, or other suitable format, is then forwarded over the network connection 302 to the network controller 304. The network controller 304 thereafter stores the status information contained in the game-specific file 306 in a game records database 308 and generates a unique identifier for the status information stored in the game records database 308. The unique identifier preferably is independent of the player's identification such that the player may remain anonymous to the network 202 and the wagering game terminal 100*a* or 100*b*, but it is also possible to use an identity-based identifier. The network controller 304 then sends the unique identifier to the wagering game terminal 100*a* or 100*b*. The wagering game terminal 100*a* or 100*b* subsequently issues the player 300 a ticket, which may be a paper ticket (e.g., barcode) or an electronic ticket (e.g., magnetic), containing the unique identifier. For paper tickets, the ticket may be issued through the information reader 110 or any other suitable means commonly used for issuing such tickets.

When the player 300 returns to one of the wagering game terminals 100*a* or 100*b*, he or she may present his or her ticket to the information reader 110 to retrieve his or her game status information. The wagering game terminal 100*a* or 100*b* may be any wagering game terminal on the network 202 and does not have to be the same wagering game terminal that the player 300 played on previously or even a wagering game terminal in the same casino. Upon receiving the ticket, the wagering game terminal 100*a* or 100*b* sends a request to the network controller 304 to retrieve the status information stored in the game records database 308 that corresponds to the unique identifier of the ticket presented. If the network controller 304 determines that the ticket is valid, it retrieves the corresponding status information from the game records database 308 and sends the information back to the wagering game terminal 100*a* or 100*b*. The network controller 304 thereafter either deletes the status information stored in the game records database 308 or marks it as "claimed" so that it is not reused. The terminal 100*a* or 100*b* then configures itself according to the game status information received from the network controller 304.

In embodiments where the wagering game terminals 100*a* and 100*b* are stand-alone terminals that are not connected to the network 202, the game status information may be created by the controller 200 (FIG. 2) and stored in the local memory 210 of each wagering game terminal 100*a* or 100*b* instead of on the network 202. Then, when the player 300 returns to the same stand-alone wagering game terminal 100*a* or 100*b* to present his or her ticket (e.g., via the information reader 110), the appropriate game status information may be retrieved based on the unique identifier on the ticket. The controller 200 thereafter restores the player's game status along with any other information that was stored in the local memory 210. This allows the player to retain the benefit of his or her earlier efforts, thereby increasing the player's interest and commitment to a game.

In some embodiments, instead of a ticket, the information reader 110 may include a card reader, and the unique identifier provided by the wagering game terminal 100*a* or 100*b* may be stored on a player's personal identification card. It is also possible to store the entire game-specific file 306 on the player's personal identification card instead of just the unique identifier. Or, the wagering game terminal 100*a* or 100*b* may include a radio frequency identification device (RFID) transceiver or receiver (not shown) such that an RFID transponder held by the player can be used to provide the unique identifier at the wagering game terminal 100*a* or 100*b* without the need to insert a card into the information reader 110. RFID components can be those available from Pacific Northwest National Laboratory (under the United States Department of Energy) of Richland, Wash.

In other embodiments, the information reader 110 may also include a biometric reader, such as a finger, hand, or retina scanner, and the unique identifier may be the scanned biometric information. Additional information regarding biometric scanning, such as fingerprint scanning or hand geometry scanning, is available from International Biometric Group LLC of New York, N.Y. Other biometric identification techniques can be used as well for providing a unique identifier of the player. For example, a microphone can be used in a biometric identification device on the wagering game terminal so that the player can be recognized using a voice recognition system.

In addition to the game records database 308, the network controller 304 further includes a game-assets database 310 for storing wagering game updates and future features for the wagering game terminals 100*a* and 100*b*. The updates stored in the game-assets database 310 may generally be software updates and may include, for example, image files, sound files, text files, raw data, tables, program codes, executable codes, and the like. In some embodiments, the files, data, tables, codes, etc., stored in the game-assets database 310 represent updates to existing basic and/or bonus games, for example, variations or additions to a current episode or additional episodes that are added to an existing bonus game. In other embodiments, the files, data, tables, codes, etc., may represent entirely new games and/or new groups of games, for example, new basic games, new bonus games, and/or new groups of bonus games, that are added to the wagering game terminals 100*a* and 1000*b*.

A download service 312 in the network controller 304 facilitates the transfer of the updates to the wagering game terminals 100*a* and 100*b*. The download service 312 may conduct the transfer using any suitable file transfer protocol known to those having ordinary skill in the art, including FTP (File Transfer Protocol), HTML (Hypertext Markup Language), IP (Internet Protocol), Kermit, Telnet, Rlogin, XModem, YModem, ZModem, and the like. Where the network connection 302 is a wireless connection, any wireless file transfer protocol known to those having ordinary skill in the art may also be used. Using the download service 312, the network controller 304 may download the updates to each wagering game terminal 100*a* and 100*b* directly, or it may provide the updates to a local network controller 304' connected to the network 202. The local network controller 304', which may or may not be operated by the same casino, may then provide the updates to other wagering game terminals 100*a*' and 100*b*'.

The above arrangement allows updates and improvements to existing wagering games and/or new wagering games to be developed and uploaded to the bank controller 304 and subsequently downloaded to the wagering game terminals 100*a*, 100*b*, 100*a*' and 100*b*' so that new wagering game content may be available to the player on an ongoing basis. Moreover, the availability of updated content allows each player to experience an entirely unique wagering game experience based on the particular bonus games, game assets, and/or features he or she may be able to unlock.

The timing of the updates may be in real time, for example, immediately after the player unlocks a certain bonus game, acquires a certain game asset, completes a certain game or game task, and the like. Alternatively, the timing of the updates may be according to a regular or irregular schedule that is independent of the player, for example, weekly, monthly, quarterly, and the like. The scheduled updates may occur in the background undetected by the player, or they may be released as one or more special events that are widely promoted within and/or outside the casino, for example, as a special rollout, premiere, or an opening-night event. In the latter case, an appropriate celebration may be hosted by the casino to mark the occasion, with a daily or hourly countdown mechanism, possibly displayed on the wagering game terminals 100*a*, 100*b*, 100*a*' and 100*b*', to count down the time until the updates are released.

It is also possible to provide the updates on a seasonal basis, or to time the updates to coincide with certain holidays. For these cases, the content of the updates may reflect the season (e.g., skis for winter) or the holiday (e.g., turkeys for Thanksgiving). In some implementations, the players themselves may be allowed to initiate a request for an update from the bank controller 304, for example, where the wagering game terminal 100*a* is a multi-game terminal, but the game assets for a particular wagering game are not yet available at the wagering game terminal 100*a* or a local network controller 304'. In that case, the player may initiate a request from the wagering game terminal 100*a* to the bank controller 304 to download the needed game assets.

Figure 4:
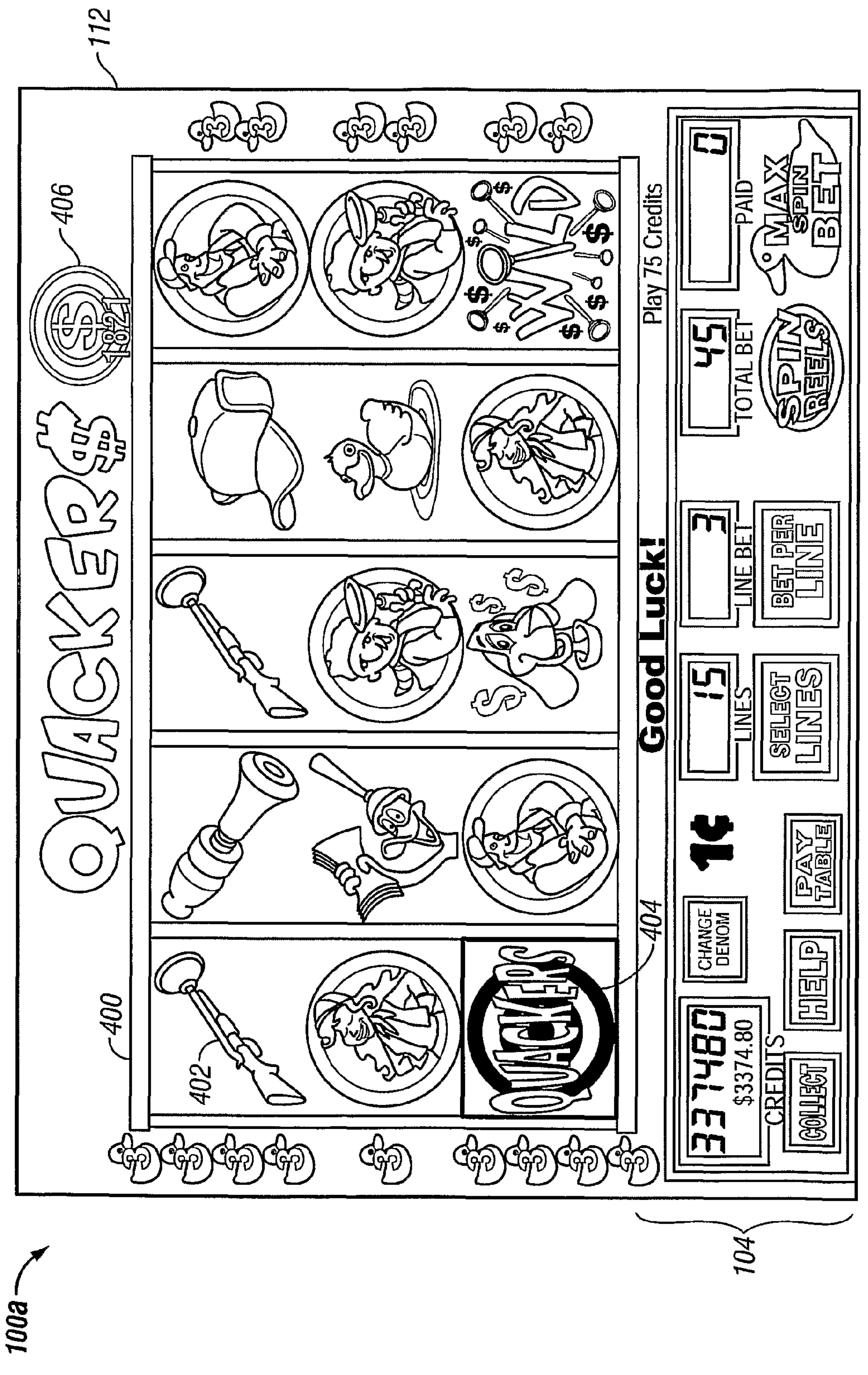
FIG. 4 illustrates a symbol combination representing a randomly selected outcome according to one embodiment of the invention.

FIG. 4 illustrates the main display 112 of one of the wagering game terminals, for example, the first wagering game terminal 100*a*. Shown on the main display 112 is a basic wagering game, for example, a video slots game having a duck hunting related theme called "Quackers." Touch screen buttons 104 allow players to place bets, select paylines, and generally play the basic wagering game. In the present example, the basic wagering game includes a plurality of reels, one of which is indicated at 400. Each reel 400 contains several symbols 402, including at least one special-event symbol 404. The special-event symbol 404, in keeping with the theme of the basic wagering game, is a "Quackers" symbol. The occurrence of the special-event symbol 404 on an active payline triggers a special event on the wagering game terminal 100*a*.

In accordance with embodiments of the invention, the special event triggered by the occurrence of the special-event symbol 404 includes a map (see FIG. 5) containing a series of bonus destinations. The bonus destinations may be temporal destinations (e.g., periods in history) or they may be geographical destinations (e.g., places around the world). Each bonus destination, when selected, reveals a plurality of bonus games from which the player may choose. The bonus games for each bonus destinations may be related by a common game theme and/or a game type (e.g., cards, slots, etc.), but are preferably dissimilar enough to give the player an opportunity to experience a variety of different bonus games. Furthermore, one or more of the bonus games at one or more of the bonus destinations may be locked or temporarily unavailable such that the player must unlock the bonus game before playing it. Similarly, one or more features of one or more bonus games may also be locked or temporarily unavailable, requiring the player to unlock the features in order to use them.

In one embodiment, the player's ability to unlock a locked bonus game (or feature) depends on the player's eligibility ranking in the current wagering game session. The eligibility ranking may be based on a number of factors, including acquisition of certain game assets (e.g., a key), reaching certain game milestones (e.g., completing a bonus game), exceeding a certain level of wagering activity, and the like. In one implementation, the player may be ranked according to his or her level of "turnover" at the wagering game terminal 100*a* or 100*b*. Turnover refers to the amount of credits wagered at a wagering game terminal over a predetermined interval (e.g., 30 seconds, one minute, etc.). During the course of game play, the network controller 304 periodically assesses the level of turnover at the wagering game terminals 100*a* and 100*b*. The level of turnover may then be used to determine the player's eligibility ranking in the current wagering game session.

The eligibility ranking, in one embodiment, may be indicated using one or more virtual tokens 406 displayed on the main display 112 (e.g., in the upper right-hand corner). The virtual tokens 406 may have different colors to identify the player's particular ranking, such as bronze for the lowest ranking, silver for an intermediate ranking, and gold for the highest ranking. An exemplary eligibility ranking scheme is shown below in TABLE 1.

TABLE 1

| Turnover | Virtual Token |
|---|---|
| \$0-\$2.50 | Bronze Coin |
| \$2.51-\$5.00 | Silver Coin |
| \$5.01-\$10.00 | Gold Coin |

Although only one virtual coin 406 is shown in FIG. 4, if a wagering game terminal has more than \$10 of turnover, it may display more than one virtual coin 406 (e.g., gold and silver coins for \$13 of turnover) and its player may be granted access to a higher number of bonus games and/or features accordingly.

Figure 5:
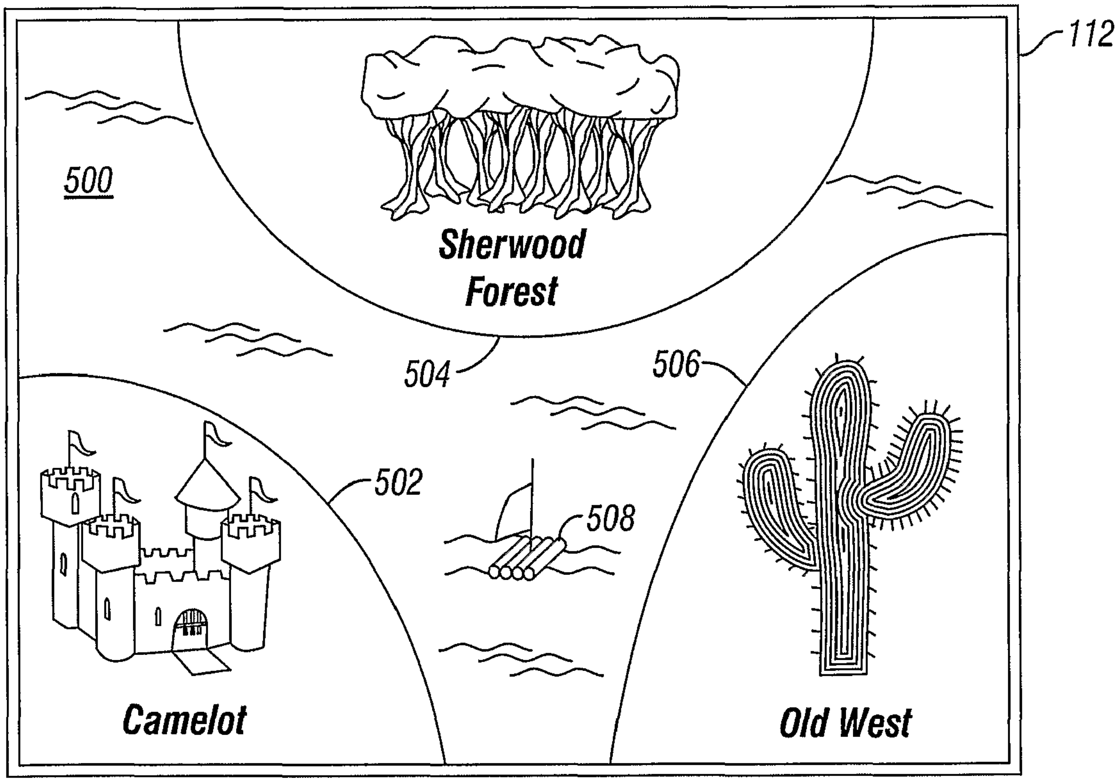
FIG. 5 illustrates an exemplary map of various bonus destinations that a player may select according to one embodiment of the invention.

FIG. 5 illustrates an exemplary map 500 of bonus destinations that may be displayed on the main display 112 (or possibly on the secondary display 114) when the special-event symbol 404 occurs on the wagering game terminal **100*a*. The map 500 includes a plurality of bonus destinations 502, 504, and 506 that may be selected by the player. The bonus destinations 502, 504, and 506 themselves are not bonus games, but represent groups of bonus games that may be played when one of the bonus destinations 502, 504, or 506 is selected. As mentioned above, each bonus destination 502, 504, and 506 may represent a type of bonus game (e.g., free spins, free picks, cards, dice, etc.) or it may indicate the particular theme of the bonus games (e.g., "Camelot," "Sherwood Forest," "Old West," etc.). A player avatar 508 may then be used to select the bonus destinations 502, 504, and 506**.

When selected, each bonus destination 502, 504, and 506 reveals a plurality of bonus game choices to the player. This can be seen in FIG. 6, where selection of the "Camelot" bonus destination 502 reveals three different bonus game choices, represented by doors 600, 602, and 604. The player may then play the bonus games by opening the doors 600, 602, or 604. However, one or more of the bonus game choices, for example, the one represented by the second door 602, may be locked to the player. The player must then unlock the door 602 in order to play the bonus game. In some embodiments, the player may be given an incentive to unlock the locked door 602, for example, by making the locked bonus game a more lucrative bonus game. Unlocking the door 602, however, may require that the player achieve at least a certain minimum eligibility ranking, as reflected, for example, by his or her virtual token 406.

As mentioned above, the eligibility ranking may be based on a number of factors, including acquisition of certain game assets, reaching certain game milestones, exceeding certain levels of turnover, and the like. In addition, some factors may be interchangeable with other factors so that one or the other will suffice (e.g., either finding a key or 100 credits). Also, several factors may be combined so that all factors in the combination must be present (e.g., finding both a key and 100 credits). Other ways of indicating the player's eligibility ranking instead of the virtual token 406 may also be used without departing from the scope of the invention, including by displaying an appropriate game asset icon on the main display 112 to reflect acquisition of certain game assets.

Figure 7:
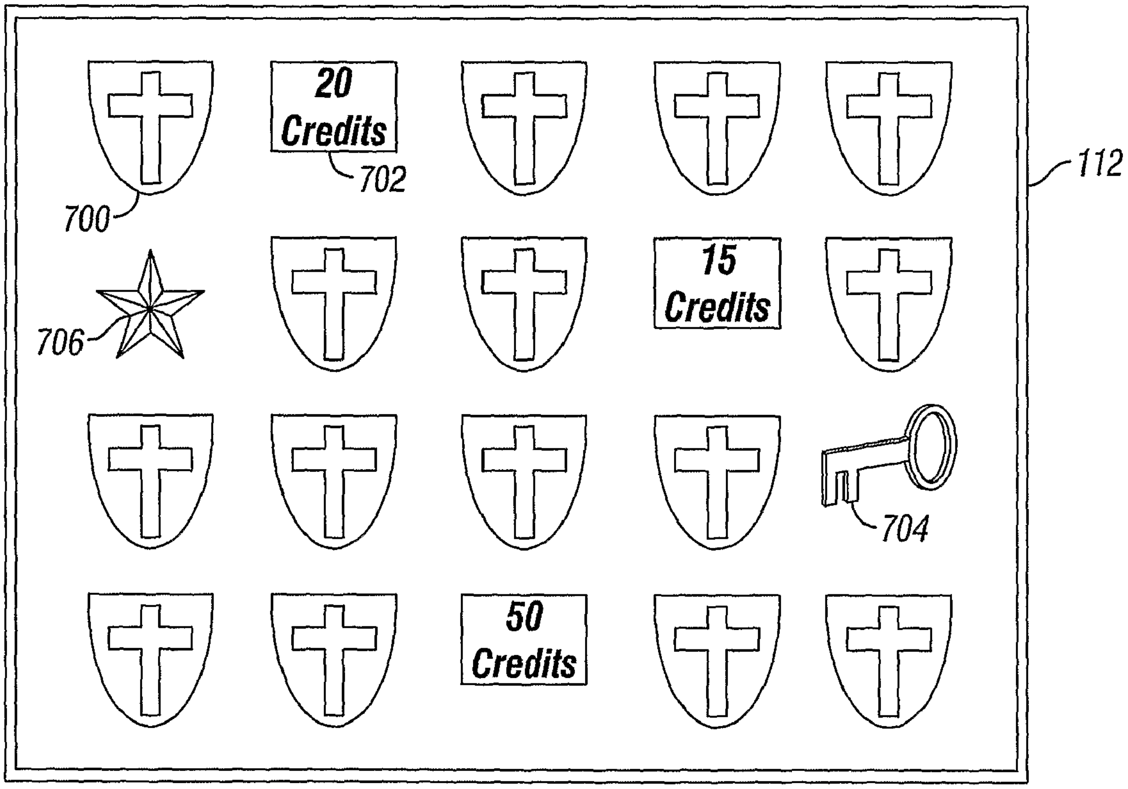
FIG. 7 illustrates an exemplary bonus game that a player may play upon choosing one of the bonus games according to one embodiment of the invention.

An implementation where the player is required to collect certain game assets in other bonus games before being able to access the locked bonus game is shown in FIG. 7. Here, the player has selected one of the unlocked doors (e.g., the first door 600) and is presented with a player-selection game where the player is provided with a plurality of shields 700 from which he or she may pick. Each shield 700 reveals either a credit amount 702, a key 704, or a star 706 when picked. Picking a shield 700 that results in a star 706 will terminate the bonus game and return the player to the basic wagering game. On the other hand, picking a shield 700 that results in a key 704 will allow the player to unlock the locked door 602 on the next occurrence of the special-event symbol 404 (see FIG. 4).

Other ways to unlock a locked bonus game may include, for example, requiring the player to collect several keys 704, possibly over multiple wagering game sessions. The keys may be color-coded in some cases so that a certain color key 704 can only unlock doors 602 having the same color. In some embodiments, there may be a master key that can unlock all locked bonus games, either at a particular bonus destination or at all bonus destinations. Or the player may immediately unlock all locked bonus games at a particular bonus destination by completing a predetermined bonus game or game task at that destination. In addition to (or instead of) a bonus game, the keys 704 or other symbols may also be made available in the basic wagering game for the player to accumulate.

Figure 6:
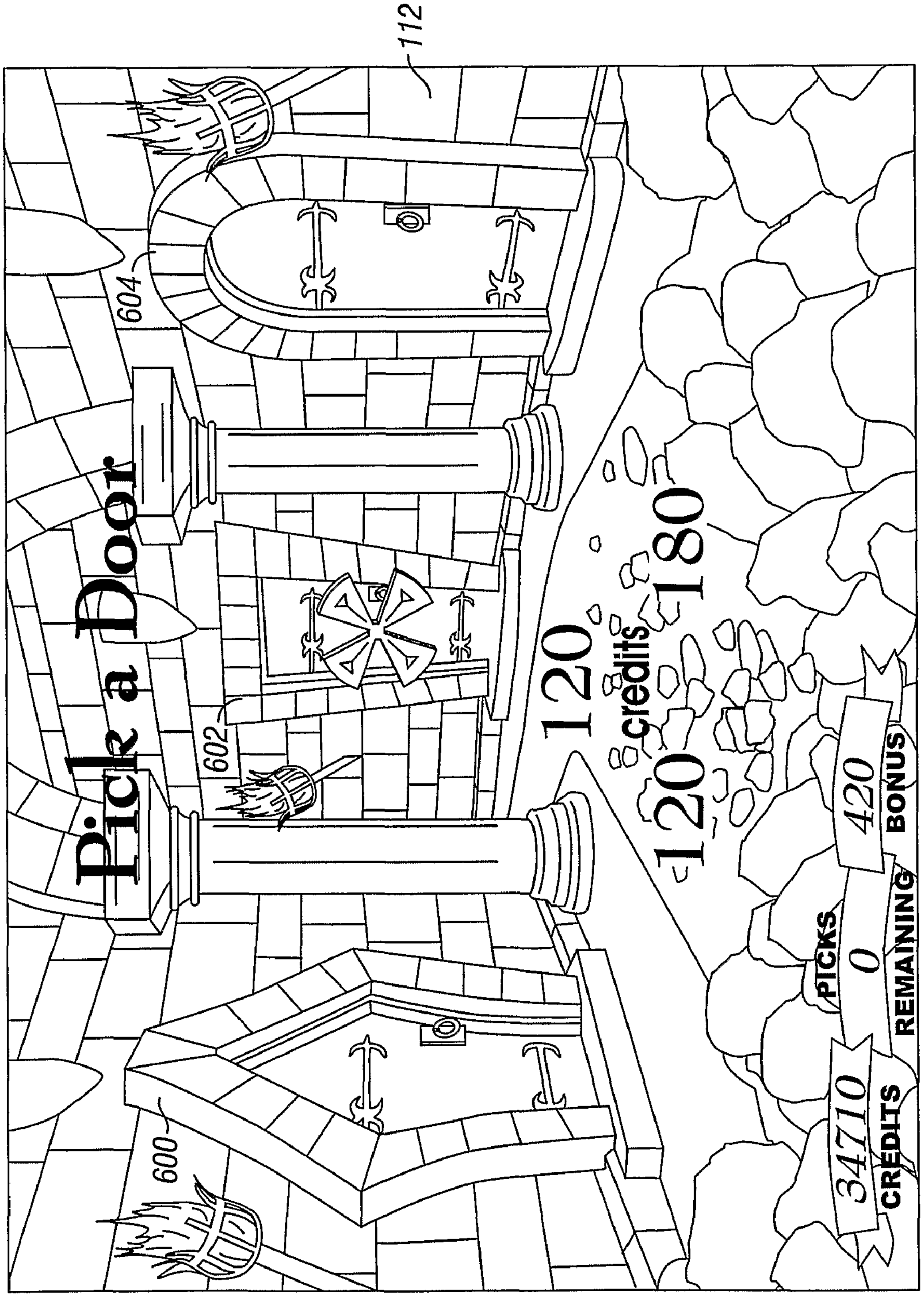
FIG. 6 illustrates various bonus games from which a player may choose upon selecting one of the bonus destinations according to one embodiment of the invention.
Figure 8:
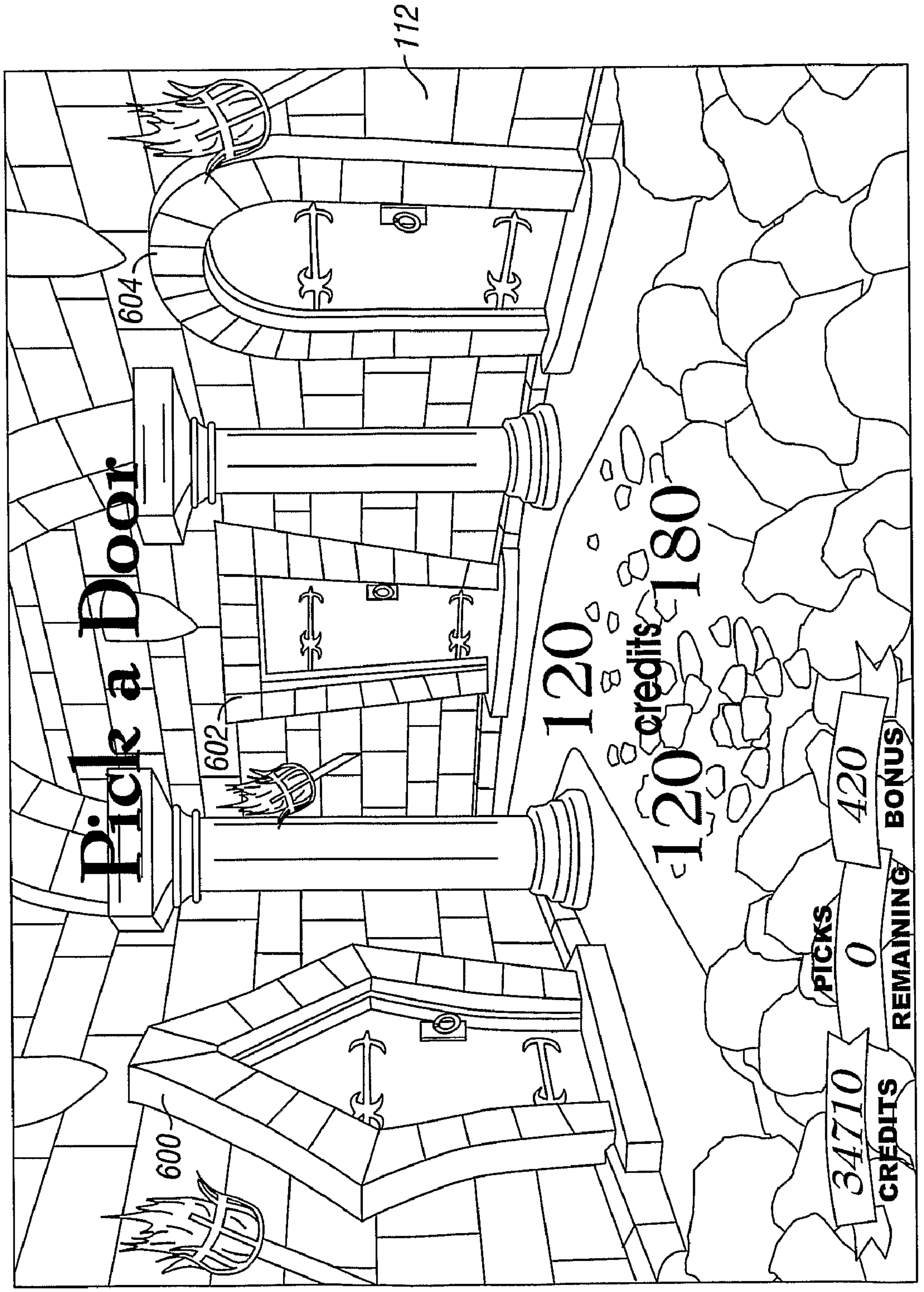
FIG. 8 illustrates a previously locked bonus game that has been unlocked according to one embodiment of the invention.

FIG. 8 illustrates the bonus destination depicted in FIG. 6, except that the player has now achieved the necessary eligibility ranking to unlock the locked bonus game. As can be seen, the door 602 is no longer locked and the player may now open the door 602 to play the bonus game. The player may then save the unlocked status of the bonus game, along with other status information for the current wagering game session (e.g., bonus destinations selected, games completed, assets acquired, eligibility ranking, credits won, etc.) on the network 202 using the TITO system (see FIG. 3). When the player comes back to the wagering game terminal **102*a* or another wagering game terminal connected to the network 202**, the player may retrieve the stored status information and continue playing from approximately where he or she left off.

Figure 9:
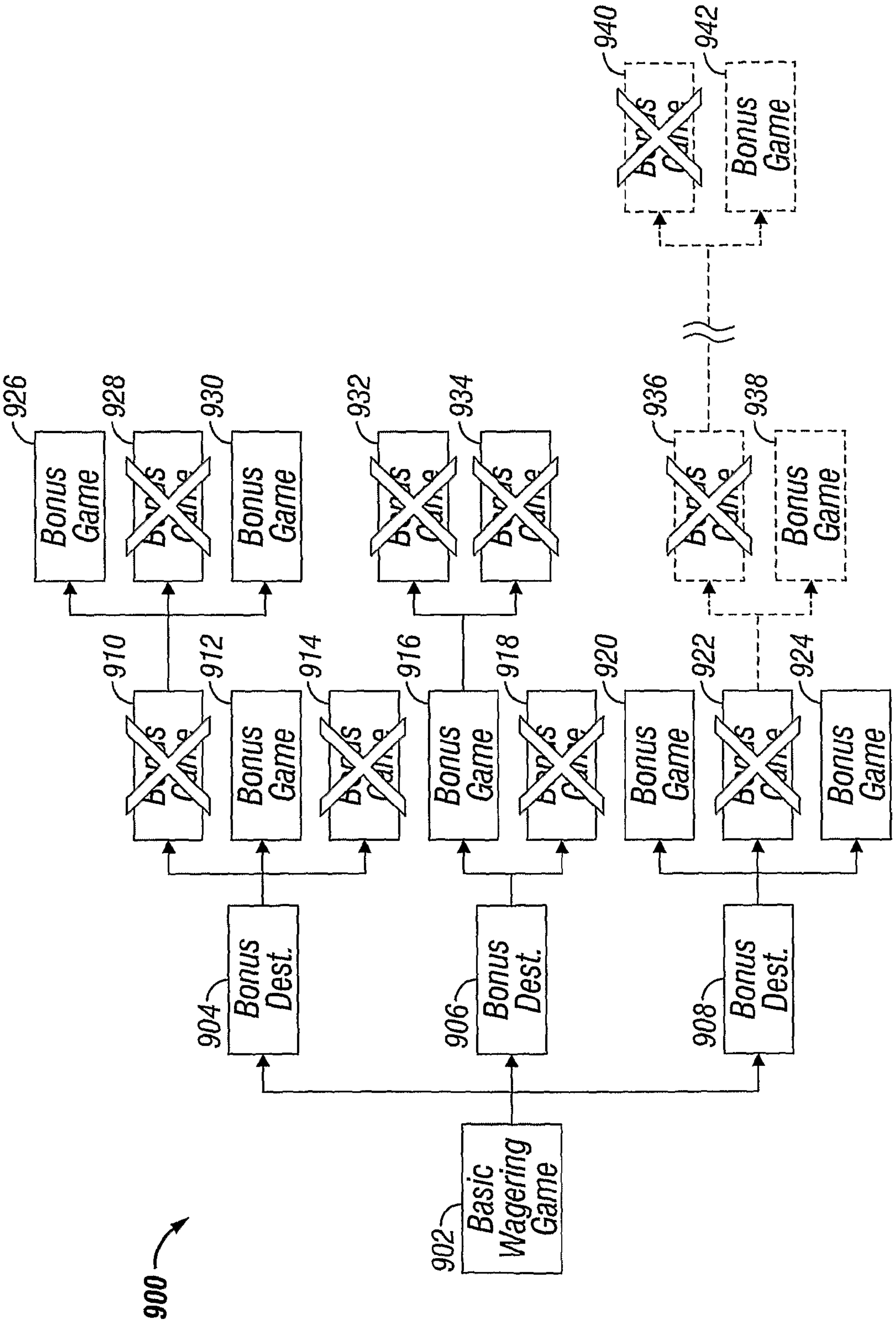
FIG. 9 illustrates multiple layers of bonus games, including downloadable bonus games, according to one embodiment of the invention.

In some embodiments, there may be multiple layers of bonus games, as illustrated in FIG. 9. Here, a block diagram 900 shows that upon occurrence of a certain outcome in the basic wagering game 902, the player is given an opportunity to select from a plurality of bonus destinations 904, 906, and 908. As before, each bonus destination 904, 906, and 908 reveals a plurality of bonus games when selected. Thus, the first bonus destination 904 reveals bonus games 910, 912, and 914, the second bonus destination 906 reveals bonus games 916 and 918, and the third bonus destination 908 reveals bonus games 920, 922, and 924. Also, as before, some of the bonus games, for example, bonus games 910, 914, 918, and 922, may be locked and the player must unlock them in order to play. For some embodiments, the bonus destinations themselves may also be locked. In FIG. 9, for example, the third bonus destination 908 is locked, thus requiring the player to unlock that bonus destination 908 in order to reveal the bonus games 920 and 922.

In addition, some of the bonus games, such as bonus games 910 and 916, reveal an additional set or group of bonus games when their play is completed. For example, bonus game 910 reveals additional bonus games 926, 928, and 930 and bonus game 916 reveals additional bonus games 932 and 934. As in the case of the locked bonus games, the additional bonus games 932-934 may be made more lucrative relative to the first set or group of bonus games in order to give the player an incentive to play the additional bonus games 932-934. For some implementations, simply unlocking one of the bonus games (i.e., without actually playing it), such as bonus game 916, may be enough to reveal the additional bonus games so that bonus game 916 resembles a bonus destination more than it does a bonus game. Furthermore, some of the additional bonus games, such as bonus games 928, 932, and 934, may also be locked, thus requiring the player to unlock them in the manner described above before playing them.

It should be noted that, although a map and bonus destinations have been described, the various sets or groups of bonus games herein may be presented in other forms besides a map, including as doors to be opened, buttons to be pressed, a selection screen with bonus areas and/or sub-bonus areas that may be locked or unlocked, and any other suitable form. In addition, the various destinations, doors, buttons, areas, sub-areas, etc., are not limited to a bonus game, but may be awarded as part of a basic wagering game or a progressive. Furthermore, not only the bonus games and sets or groups of bonus games may be unlocked and revealed in the manner described above, but also new episodes of bonus games, game assets, features, prizes, winning symbol combinations, and the like for a particular basic and/or bonus game may also be unlocked and revealed in the same manner.

Moreover, as alluded to above with respect to FIG. 3, the bonus games, episodes of bonus games, sets or groups of bonus games, game assets, game features, prizes, and the like may already be present on the wagering game terminal 100*a*, or they may be provided as updates to the wagering game terminal 100*a* from a central location. For example, the bonus games, episodes of bonus games, sets or groups of bonus games, game assets, game features, prizes, game symbols, symbol combinations, and the like may be downloaded as updates from the game-assets database 310 in the bank controller 304 via the download service 312. The updates may be downloaded in real time as the player satisfies one or more conditions (e.g., unlocks a certain door) in the basic and/or bonus game. In this case, upon satisfying the one or more conditions, the wagering game terminal 100*a* sends an appropriate signal to the bank controller 304 to begin downloading the updates from the game-assets database 310. Alternatively, the updates may be downloaded at a predetermined time, or according to predefined schedule. In that case, the bank controller 304 may begin the download automatically at the appropriate time without waiting to receive a signal from the wagering game terminal 100*a*.

Referring again to FIG. 9, a specific example of the foregoing can be seen where unlocking the bonus game 922 reveals two additional bonus games 936 and 938. The additional bonus games 936-938, however, are not already present on the wagering game terminal 100*a* and must instead be downloaded from the bank controller 304, as indicated by the dotted lines. Furthermore, one of the newly downloaded bonus games, for example, the one indicated at 936, may be locked. Unlocking this bonus game 936 reveals two additional newly downloaded bonus games 940 and 942, one of which may also be locked. The subsequently revealed bonus games 940-942 may be downloaded together with the bonus games 936-938 so that they all are already present on the wagering game terminal 100*a* at the time they are revealed, or they may be downloaded only after the player unlocks the bonus game 936.

Alternatively, the subsequently revealed bonus games 940-942 may be downloaded according to a predetermined schedule such that they are not yet available for downloading when the player unlocks the bonus game indicated at 936. In these embodiments, the wagering game terminal 100*a* may notify the player after he or she has unlocked the bonus game 936 that the bonus games 940-942 will be revealed at a later time. The timing of the download may then be left open-ended, or the wagering game terminal 100*a* may inform the player of a specific time/date and instruct player to come back at that time/date. In the latter case, an appropriate promotional event or celebration may be hosted by the casino at the indicated time/date to mark the rollout of the bonus games 940-942.

Figure 10A:
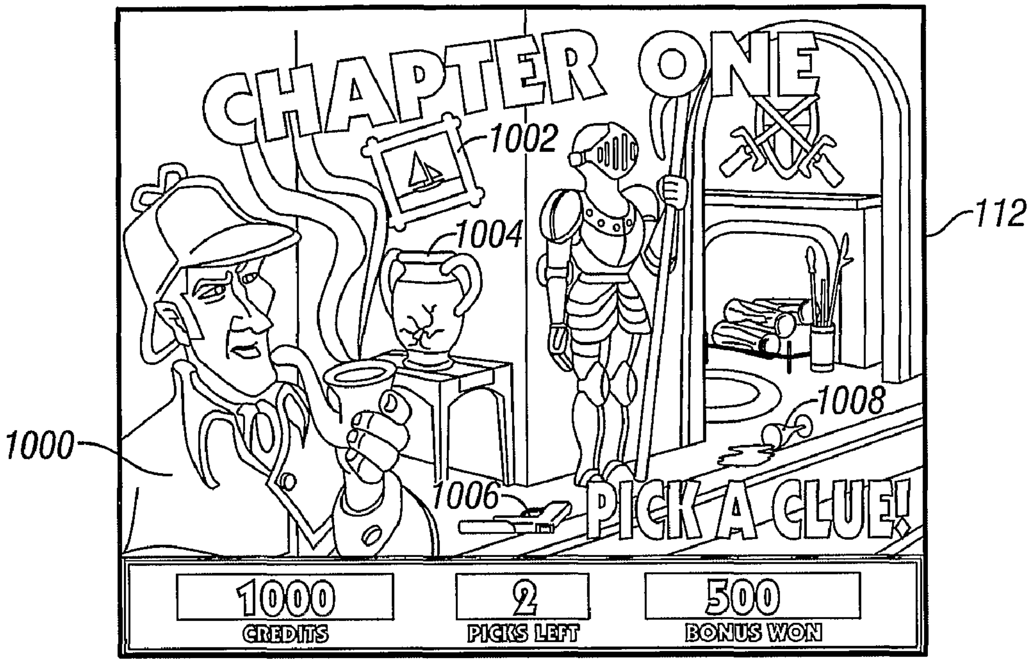
FIGS. 10A-10B illustrate downloadable aspects of a bonus game according to one embodiment of the invention.
Figure 10B:
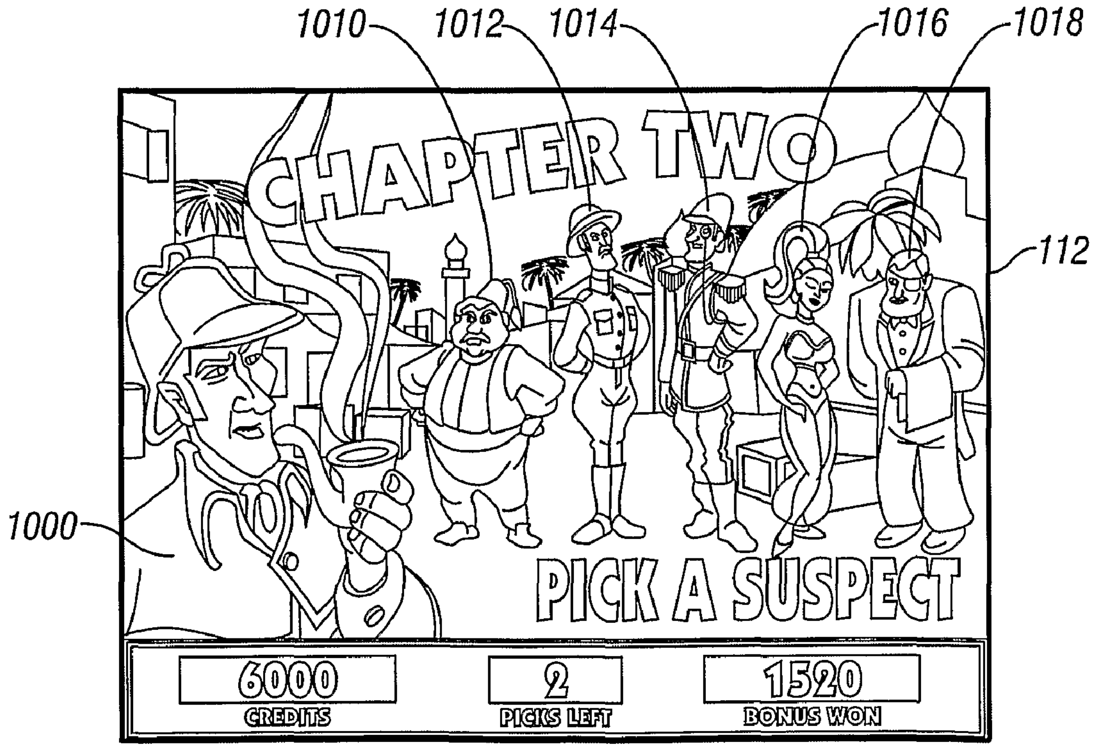

As mentioned above, not only bonus games and sets or groups of bonus games may be unlocked and revealed in the manner described above, but also new episodes of bonus games, game assets, features, prizes, and the like for a particular basic and/or bonus game may also be unlocked and revealed in the same manner. An example of an embodiment where a new level of a bonus game may be downloaded is illustrated in FIGS. 10A-10B. As can be seen in FIG. 10A, the bonus game in this embodiment is a detective or mystery type bonus game having, for example, a Sherlock Holmes theme. At a certain point in the game, the player avatar 1000 is given the opportunity to pick one or more clues 1002, 1004, 1006, and 1008. The player, through the avatar 1000, must select the appropriate clue or clues 1002-1008 in order to move on to the next level of the bonus game.

FIG. 10B illustrates the next level of the bonus game after it has been downloaded to the wagering game terminal 100*a*. In this level, the player is given the opportunity to select one or more suspects 1010, 1012, 1014, 1016, and 1018. The suspects 1010-1018 may be downloaded to the wagering terminal 100*a* as an update from the game-assets database 310 in the bank controller 304. The download may occur immediately after the player has selected the appropriate clue or clues 1002-1008 in the previous level, at which point the wagering game terminal 100*a* sends an appropriate signal to the bank controller 304 to initiate the download. Or, the download may occur at a predetermined time, or according to a predefined schedule independent of the player, in which case the bank controller 304 automatically initiates the download.

Once the player has selected the appropriate suspect or suspects 1010-1018, he or she may be awarded a prize (e.g., a credit amount), game assets, and/or be allowed to move on to the next level of the bonus game, or an entirely different bonus game. The prize, game assets, next level, and/or different bonus game may already be present on the wagering game terminal 100*a*, or they may be downloaded from the bank controller 304 in the manner described above.

While the invention has been described with reference to one or more particular embodiments, those skilled in the art will recognize that many changes may be made thereto without departing from the spirit and scope of the present invention. Accordingly, each of these embodiments and obvious variations thereof is contemplated as falling within the spirit and scope of the claimed invention, which is set forth in the following claims.

What is claimed is:

1. A gaming system comprising:

at least one input device;

at least one display device;

at least one processor; and at least one memory device which stores a plurality of instructions which, when executed by the at least one processor, cause the at least one processor to operate with the at least one display device and the at least one input device to:

receive a wager to play a wagering game;

in response to a triggering-event in a base-game outcome of the wagering game, display a selection screen including a plurality of player-selectable game groups, each game group being associated with a respective plurality of bonus games;

in response to any of the game groups being selected by the player, reveal the plurality of bonus games associated with the selected game group, at least one of the bonus games in the revealed plurality of bonus games being initially unavailable to the player for play; and in response to the player achieving a certain eligibility ranking based on one or more game play criteria, unlock the at least one of the bonus games such that it is available to the player for play.

2. The gaming system of claim 1, wherein the one or more game play criteria include one or more of acquiring certain game assets, reaching certain game milestones, and exceeding a certain level of wagering activity.

3. The gaming system of claim 1, further including permitting the player to save an unlocked status of the at least one of the bonus games from a current gaming session to a subsequent gaming session.

4. The gaming system of claim 1, wherein each of the plurality of bonus games associated with each game group is further associated with a respective additional plurality of games, wherein the at least one memory device causes the at least one processor to operate with the at least one display device and the at least one input device to:

in response to play of a bonus game in the plurality of bonus games being completed, reveal the additional plurality of games associated with the completed bonus game, at least one of the games in the revealed additional plurality of games being initially unavailable to the player for play; and in response to the player achieving a certain eligibility ranking based on one or more game play criteria, unlock the at least one of the games in the revealed additional plurality of games such that it is available to the player for play.

5. The gaming system of claim 1, wherein the plurality of bonus games in each game group share a commonality that is different from the commonalities of the other game groups in the plurality of game groups.

6. The gaming system of claim 5, wherein the commonality is game theme or game type.

7. The gaming system of claim 1, wherein the at least one memory device resides in a gaming terminal, and wherein the at least one of the bonus games is downloaded to the memory device from a network database.

8. A gaming device under control of at least one processor, the gaming device comprising:

at least one input device;

at least one display device;

at least one memory device which stores a plurality of instructions which, when executed by the at least one processor, cause the at least one processor to operate with the at least one display device and the at least one input device to:

receive a wager to play a wagering game;

in response to a triggering-event in a base-game outcome of the wagering game, display a selection screen including a plurality of player-selectable game groups, each game group being associated with a respective plurality of bonus games;

in response to any of the game groups being selected by the player, reveal the plurality of bonus games associated with the selected game group, at least one of the bonus games in the revealed plurality of bonus games being initially unavailable to the player for play; and in response to the player achieving a certain eligibility ranking based on one or more game play criteria, unlock the at least one of the bonus games such that it is available to the player for play.

9. The gaming device of claim 8, wherein the one or more game play criteria include one or more of acquiring certain game assets, reaching certain game milestones, and exceeding a certain level of wagering activity.

10. The gaming device of claim 8, further including permitting the player to save an unlocked status of the at least one of the bonus games from a current gaming session to a subsequent gaming session.

11. The gaming device of claim 8, wherein each of the plurality of bonus games associated with each game group is further associated with a respective additional plurality of games, wherein the at least one memory device causes the at least one processor to operate with the at least one display device and the at least one input device to:

in response to play of a bonus game in the plurality of games being completed, reveal the additional plurality of games associated with the completed bonus game, at least one of the games in the revealed additional plurality of games being initially unavailable to the player for play; and in response to the player achieving a certain eligibility ranking based on one or more game play criteria, unlock the at least one of the games in the revealed additional plurality of games such that it is available to the player for play.

12. The gaming device of claim 8, wherein the plurality of bonus games in each game group share a commonality that is different from the commonalities of the other game groups in the plurality of game groups.

13. The gaming device of claim 8, wherein the commonality is game theme or game type.

14. The gaming device of claim 8, wherein the at least one memory device resides in a gaming terminal, and wherein the at least one of the bonus games is downloaded to the memory device from a network database.

15. A computer-implemented method for implementing a wagering game in a gaming system with at least one input device, at least one display device and one or more processors, the method comprising:

receiving a wager via the at least one input device;

displaying the wagering game via the at least one display device; and performing, via the one or more processors responsive to execution of instructions for the wagering game borne by at least one physical memory device and an occurrence of a triggering-event in a base-game outcome of the wagering game, the acts of:

displaying a selection screen including a plurality of player-selectable game groups, each game group being associated with a respective plurality of bonus games;

receiving, via at least one input device, a selection of one of the plurality of player-selectable game groups;

revealing, responsive to the receiving of the selection of one of the plurality of player-selectable game groups, the plurality of bonus games associated with the selected game group, at least one of the bonus games in the revealed plurality of bonus games being initially unavailable to the player for play; and unlocking the at least one of the bonus games such that it is available to the player for play responsive to achievement by the player of a predetermined eligibility ranking based on one or more game play criteria.

16. The computer-implemented method of claim 15, wherein the one or more game play criteria include one or more of acquiring certain game assets, reaching certain game milestones, and exceeding a certain level of wagering activity.

17. The computer-implemented method of claim 15, wherein the one or more processors are configured, responsive to execution of instructions for the wagering game and an occurrence of a triggering-event outcome, to perform the act of:

permitting the player to save an unlocked status of the at least one of the bonus games from a current gaming session to a subsequent gaming session.

18. The computer-implemented method of claim 15, wherein each of the plurality of bonus games associated with each game group is further associated with a respective additional plurality of games, wherein the at least one physical memory device causes the one or more processors to operate with the at least one display device and the at least one input device to:

in response to play of a bonus game in the plurality of bonus games being completed, reveal the additional plurality of games associated with the completed bonus game, at least one of the games in the revealed additional plurality of games being initially unavailable to the player for play; and in response to the player achieving a certain eligibility ranking based on one or more game play criteria, unlock the at least one of the games in the revealed additional plurality of games such that it is available to the player for play.

19. The computer-implemented method of claim 15, wherein the plurality of bonus games in each game group share a commonality that is different from the commonalities of the other game groups in the plurality of game groups.

20. The computer-implemented method of claim 15, wherein the commonality is game theme or game type.

21. The computer-implemented method of claim 15, wherein the at least one physical memory device comprises a physical memory device residing in a wagering game terminal, and wherein the at least one of the bonus games is downloaded to the physical memory device of the wagering game terminal from a network database.

22. A computer program product with one or more non-transient machine-readable storage media including instructions which, when executed by one or more processors, cause the one or more processors to perform operations comprising:

receiving a wager to play a wagering game;

conducting a base game of the wagering game;

randomly determining an outcome of the base game;

determining if the randomly determined base-game outcome of the wagering game comprises a triggering-event;

in response to the triggering-event in the base-game outcome of the wagering game, display a selection screen including a plurality of player-selectable game groups, each game group being associated with a respective plurality of bonus games;

in response to any of the game groups being selected by the player, reveal the plurality of bonus games associated with the selected game group, at least one of the bonus games in the revealed plurality of bonus games being initially unavailable to the player for play; and in response to the player achieving a certain eligibility ranking based on one or more game play criteria, unlock the at least one of the bonus games such that it is available to the player for play.

* * * * *